United States Patent
Tsao et al.

(10) Patent No.: US 8,011,821 B2
(45) Date of Patent: Sep. 6, 2011

(54) PLANAR ILLUMINATION DEVICE

(75) Inventors: Chih-Chung Tsao, Miao-Li Hsien (TW); Mei-Jiun Lin, Miao-Li Hsien (TW); Hung-Chih Yang, Miao-Li Hsien (TW); Shu-Hui Hsieh, Miao-Li Hsien (TW); Chih-Ming Lai, Miao-Li Hsien (TW); Tse-An Lee, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/795,819

(22) Filed: Jun. 8, 2010

(65) Prior Publication Data

US 2010/0246211 A1    Sep. 30, 2010

Related U.S. Application Data

(62) Division of application No. 12/170,766, filed on Jul. 10, 2008, now abandoned.

(30) Foreign Application Priority Data

Oct. 11, 2007    (CN) .......................... 2007 1 0201998

(51) Int. Cl.
*F21V 5/00* (2006.01)
*G02B 6/00* (2006.01)

(52) U.S. Cl. ........................ 362/619; 362/613; 362/27

(58) Field of Classification Search ............... 362/602, 362/606, 610, 612, 613, 615, 617, 619, 27
See application file for complete search history.

(56) References Cited

U.S. PATENT DOCUMENTS

| | | | | |
|---|---|---|---|---|
| 5,803,573 | A * | 9/1998 | Osawa et al. | 362/612 |
| 7,081,933 | B2 * | 7/2006 | Yu et al. | 349/62 |
| 7,108,414 | B2 * | 9/2006 | McCollum et al. | 362/604 |
| 7,286,193 | B2 * | 10/2007 | Yoo et al. | 349/62 |
| 7,452,120 | B2 * | 11/2008 | Lee et al. | 362/627 |
| 7,540,628 | B2 * | 6/2009 | Awai et al. | 362/227 |
| 7,674,030 | B2 * | 3/2010 | Poh et al. | 362/613 |
| 2002/0140880 | A1 * | 10/2002 | Weindorf et al. | 349/70 |
| 2004/0080924 | A1 * | 4/2004 | Chuang | 362/27 |

* cited by examiner

*Primary Examiner* — Jong-Suk (James) Lee
*Assistant Examiner* — Peggy A. Neils
(74) *Attorney, Agent, or Firm* — Altis Law Group, Inc.

(57) ABSTRACT

A planar illumination device includes at least one light source, a housing structure, at least one light guide plate, and at least one light exiting surface. The at least one light source is received in the housing structure. The housing structure includes at least one light emitting surface through which the light emitted from the at least one light source exits the at least one housing. The at least one light guide plate includes at least one light incidence surface through which the light enters into the at least one light guide plate, and contacts with the at least one light emitting surface. The light exits the at least one light guide plate through the at least one light exiting surface. The at least one light exiting surface includes a plurality of continuously connected bulge points formed thereon.

4 Claims, 9 Drawing Sheets

PLANAR ILLUMINATION DEVICE

CROSS-REFERENCE TO RELATED APPLICATION

This patent application is a divisional application of patent application Ser. No. 12/170,766, filed on Jul. 10, 2008, entitled "PLANAR ILLUMINATION DEVICE", assigned to the same assignee, and disclosure of which is incorporated herein by reference in its entirety.

BACKGROUND

1. Field of the Invention

The present invention relates to a planar illumination device.

2. Description of Related Art

Non-emissive display devices such as LCD panels and logo display boards are widely used in many devices. External light sources are used to illuminate the non-emissive display devices. Light emitting diodes (LEDs) are the preferred light source in non-emissive display devices instead of cold cathode fluorescent lamps (CCFLs) because of its high brightness, long life-span, and a wide color gamut. Some research on LEDs are disclosed in a paper on Proceedings of the IEEE, Vol. 93, No. 10, entitled "Solid-State Lighting: Toward Superior Illumination," published by Michael S. Shur et al., in October 2005, the disclosure of which is incorporated herein by reference.

A typical illumination device includes a plurality of LEDs as a light source. The LEDs are distributed over the illumination device and spaced apart from each other for better dissipation of heat generated by the LEDs. However, the LEDs emit light towards a target object along different directions, generating a shadow for the target object. These shadows superpose each other creating a multi-image phenomena effect which decreases the illumination efficiency of the illumination device.

Therefore an illumination device which can reduce the multi-image phenomena effect is desired to overcome the above described deficiencies.

SUMMARY

The present invention provides a planar illumination device. The planar illumination device includes at least one light source, a housing structure, at least one light guide plate, and at least one light exiting surface. The at least one light source is received in the housing structure. The housing structure includes at least one light emitting surface through which the light emitted from the at least one light source exits the at least one housing. The at least one light guide plate includes at least one light incidence surface through which the light enters into the at least one light guide plate, and contacts with the at least one light emitting surface. The light exits the at least one light guide plate through the at least one light exiting surface. The at least one light exiting surface includes a plurality of continuously connected bulge points formed thereon.

Other advantages and novel features of the present invention will become more apparent from the following detailed description of preferred embodiments when taken in conjunction with the accompanying drawings.

DETAILED DESCRIPTION OF THE EMBODIMENTS

Figure 1:
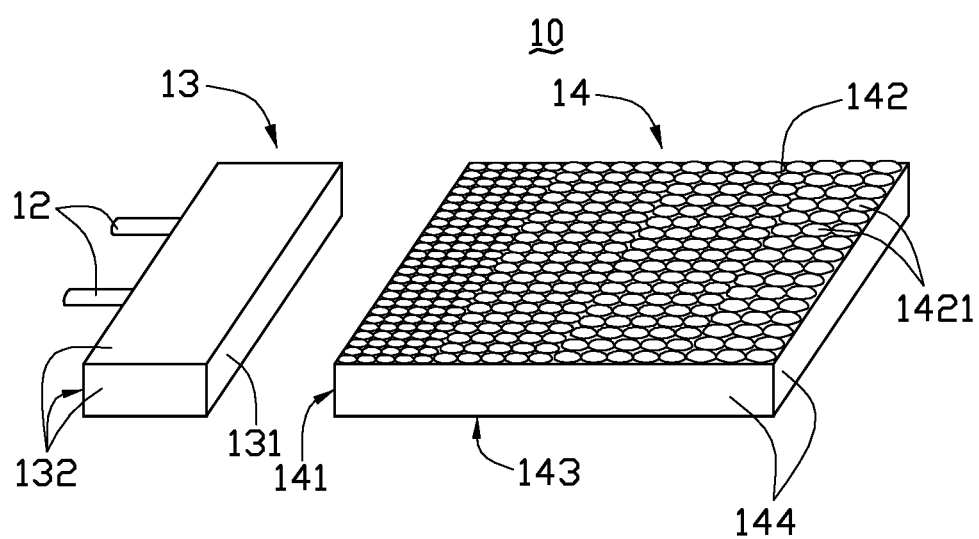
FIG. 1 is an exploded, isometric view of an embodiment of a planar illumination device.

Reference will now be made to the drawing figures to describe the embodiments in detail.

Figure 2:
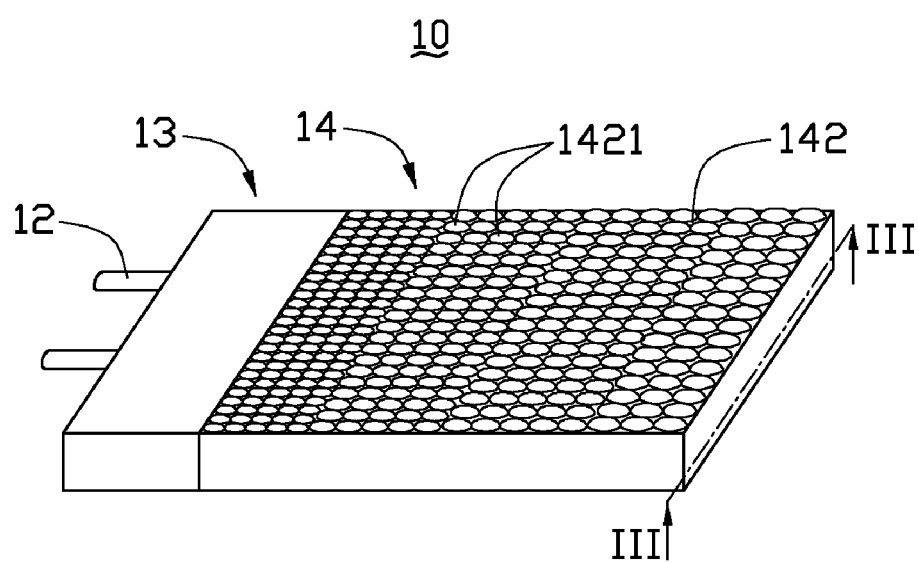
FIG. 2 is an assembled, isometric view of the illumination device of FIG. 1.
Figure 3:
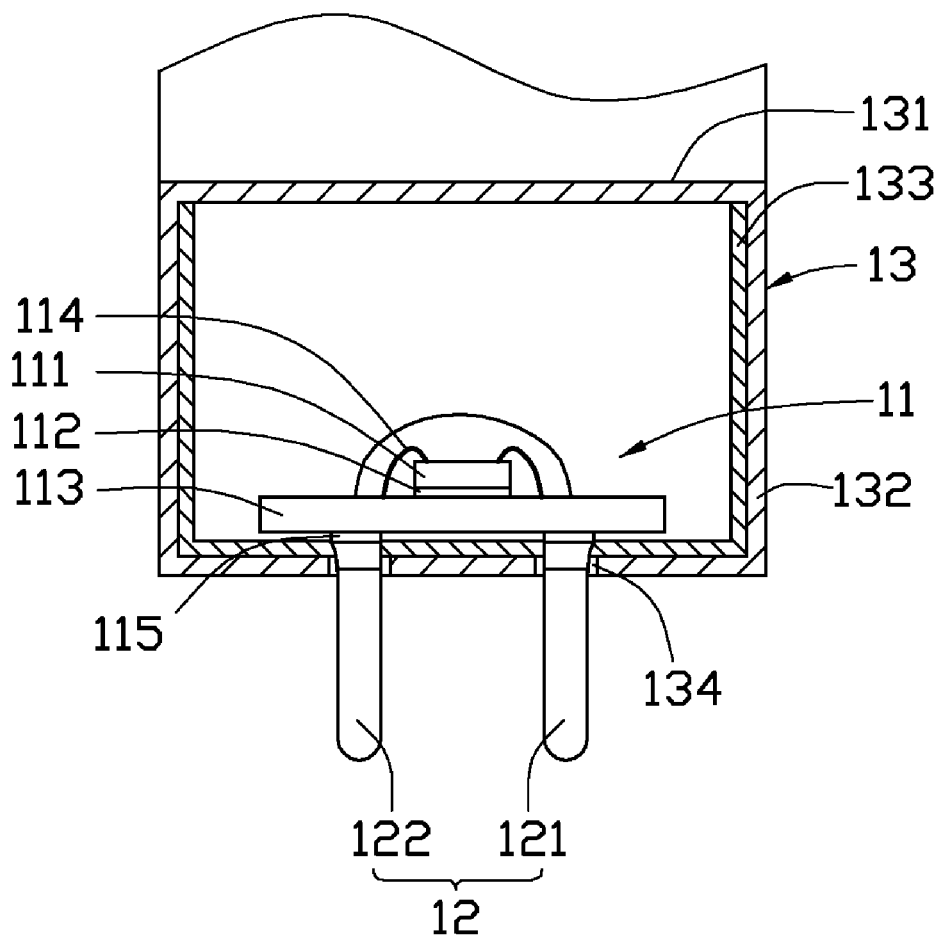
FIG. 3 is a cross sectional view of the illumination device of FIG. 2, taken along line III-III.

Referring to FIGS. 1-3, an embodiment of a planar illumination device 10 includes a LED light source 11, an electrical connector 12, a housing 13 and a light guide plate 14.

The LED light source 11 includes a point-like light emitting diode (LED) 111. The LED 111 is adhered to a printed circuit board (PCB) 113 and electrically connected to the PCB 113 via two gold wires 114. Thermal grease 112 is applied between the LED light source 11 and the PCB 113 to increase the thermal conductivity of a thermal interface. The PCB 113 is electrically connected to the electrical connector 12 via a solder paste 115.

The electrical connector 12 is connected to a power supply (not shown) which provides electric energy to the LED 111. In the illustrated embodiment, the electrical connector 12 is an insert pin inserted into a receptacle (not shown) of the power supply. The insert pin includes a first pin 121 and a second pin 122 parallel to the first pin 121. In the illustrated embodiment, the first and the second pins 121, 122 have circular cross-sections. The first and second pins 121, 122 are respectively connected to a fire wire (not shown) and a zero line (not shown) of the power supply.

In the illustrated embodiment, the housing 13 is hollow and rectangular. The housing 13 includes a light emitting surface 131 and five reflecting surfaces 132. The five reflecting surfaces 132 are coated with reflecting layers 133 inside the housing 13. The light emitting surface 131 is located at a right side of the housing 13 and faces the LED 111. A left-side reflecting surface 132 opposite the light emitting surface 132 defines two round perforations 134 for allowing the first and second pins 121, 122 of the electrical connector 12 to pass through. The housing 13 receives the LED 111.

The light guide plate 14 has a rectangular configuration. The light guide plate 14 includes a light incidence surface 141 facing the light emitting surface 132, a light exiting surface 142, a bottom surface 143 opposite to the light exiting surface 142, and three side surfaces 144 located between the light exiting surface 142 and the bottom surface 143. A reflecting layer (not shown) is coated on the bottom surface 143 inside the light guide plate 14 to reflect light toward the light exiting surface 142. Reflecting layers (not shown) are coated on the side surfaces 144 inside the light guide plate 14 to further reflect more light toward the light exiting surface 142. In another embodiment, the reflecting layer is not coated on the bottom surface 143 so light can pass through. Therefore, light can pass through the light exiting surface 142 and the bottom surface 143.

A plurality of continuously connected bulge points 1421 formed on the light exiting surface 142 evenly distributing light over the light exiting surface 142 and allow more light to pass through. A bottom end of the bulge point 1421 is tangent with a bottom end of an adjacent bulge point 1421. It may be appreciated that the bottom end of each bulge point 1421 may partially intersect the bottom end of the adjacent bulge point 1421. A diameter of the bulge point 1421 gradually decreases from the bottom end toward a top end of the bulge point 1421. A diameter of the bottom end of the bulge point 1421 gradually increases from the light incidence surface 141 towards a direction away from the light incidence surface 141. In other words, a diameter of the bottom end of the bulge point 1421 gradually increases from a position adjacent to the light source toward a position away from the light source. The configuration of the bulge point 1421 is selected from a group consisting of conic shaped, pyramid shaped, hemisphere shaped, prismoidal shaped, and truncated cone shaped. In the illustrated embodiment, the bulge point 1421 is hemisphere shaped.

It may be appreciated that the bulge point 1421 may further form gratings (not shown) for refracting or dispersing light. It may also be appreciated that the light guide plate 14 may include a plurality of dispersion particles (not shown) for refracting the light along different directions so that the light can be evenly distributed over the light exiting surface 142. A diameter of the dispersion particles is in a range of 10 to 50 microns. The materials of the dispersion particles can be selected from a group consisting of alumina, titanium oxide, silicon oxide, nitrogen oxide, sodium oxide, lithium oxide, barium oxide, zinc oxide, barium sulfate, and calcium fluoride.

The LED 111 is enclosed in the housing 13 and the electrical connector 12 extends through the housing 13 to electrically connect to the power supply. The housing 13 is attached to the light guide plate 14 with the light emitting surface 131 contacting with the light incidence surface 141. The light emitted from the LED 111 is reflected by the reflecting surfaces 132 and enters into the light guide plate 14 through the light emitting surface 131 and the light incidence surface 141. The light in the light guide plate 14 is then reflected off the bottom surface 143 and the side surfaces 144, and exits through the light exiting surface 142. When the light exits the light guide plate 14, the light is evenly distributed over the entire light exiting surface 142transforming the point-like light source 11 to a planar light source. The light from the light exiting surface 142 emits toward the target object substantially along the same direction thereby reducing the shadows of the target object and the multi-image phenomena effect.

Figure 4:
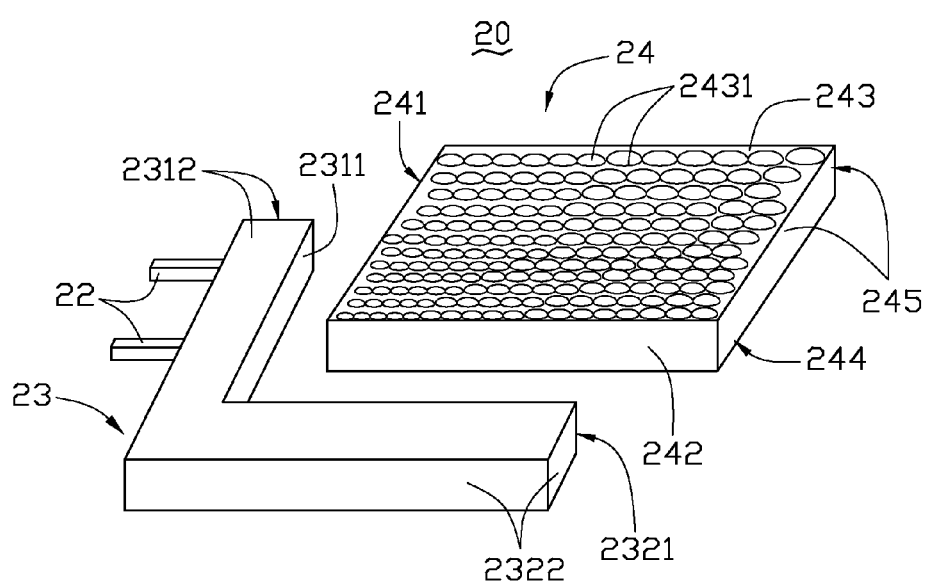
FIG. 4 is an exploded, isometric view of an embodiment of a planar illumination device.
Figure 5:
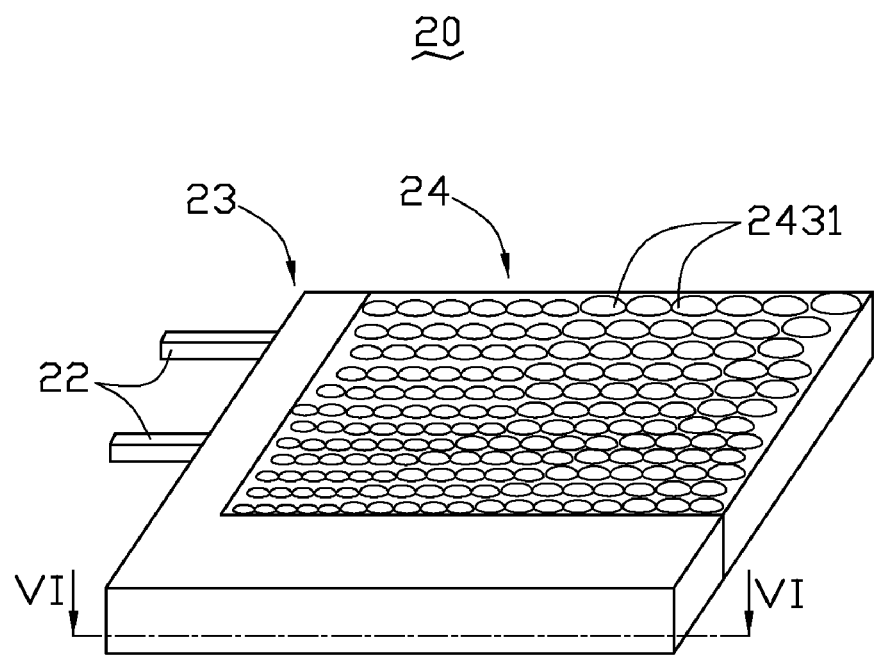
FIG. 5 is an assembled, isometric view of the illumination device of FIG. 4.
Figure 6:
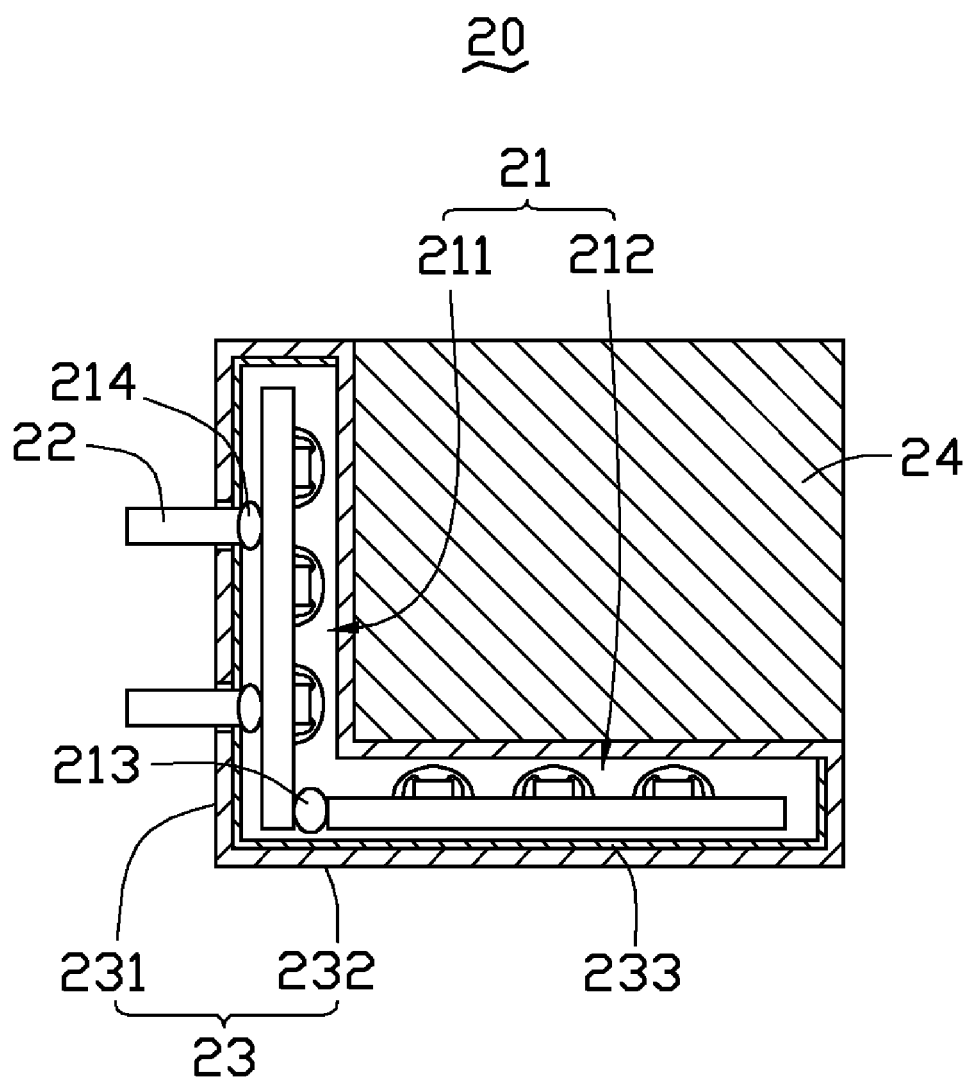
FIG. 6 is a cross sectional view of the illumination device of FIG. 4, taken along line VI-VI.

Referring to FIGS. 4-6, an embodiment of a planar illumination device 20 includes a L-shaped LED light source 21, an electrical connector 22, a L-shaped housing 23, and a light guide plate 24.

The housing 23 includes a first housing 231 and a second housing 232 perpendicularly connected to the first housing 231. The LED light source 21 includes a first LED array 211 and a second LED array 212 perpendicular to the first LED array 211. The first housing 231 encloses the first LED array 211 and the second housing 232 encloses the second LED array 212. The first and second LED arrays 211, 212 each include a plurality of LEDs (not labeled). The second LED array 212 electrically connects to the first LED array 211 via a solder ball 213. The first LED array 211 connects to pins of the electrical connector 22 via two solder joints 214. In the illustrated embodiment, the pins of the electrical connector 22 have rectangular cross-sections. The first housing 231 includes a first light emitting surface 2311 and four first reflecting surfaces 2312. The four first reflecting surfaces 2312 are coated with reflecting layers 233 inside the first housing 231. The second housing 232 includes a second light emitting surface 2321 and four second reflecting surfaces 2322. The second light emitting surface 2321 is adjacent and perpendicular to the first light emitting surface 2311. The four second reflecting surfaces 2321 are coated with reflecting layers 233.

The light guide plate 24 is rectangular shaped. The light guide plate 24 includes a first light incidence surface 241 facing the first light emitting surface 2311, a second light incidence surface 242 facing the second light emitting surface 2321 adjacent and perpendicular to the first light incidence surface 241, a light exiting surface 243, a bottom surface 244 opposite to the light exiting surface 243, and two side surfaces 245 with reflecting layers respectively coated thereon. A plurality of bulge points 2431 are formed on the light exiting surface 243 of the light guide plate 24, for evenly distributing light over the light exiting surface 243.

Figure 7:
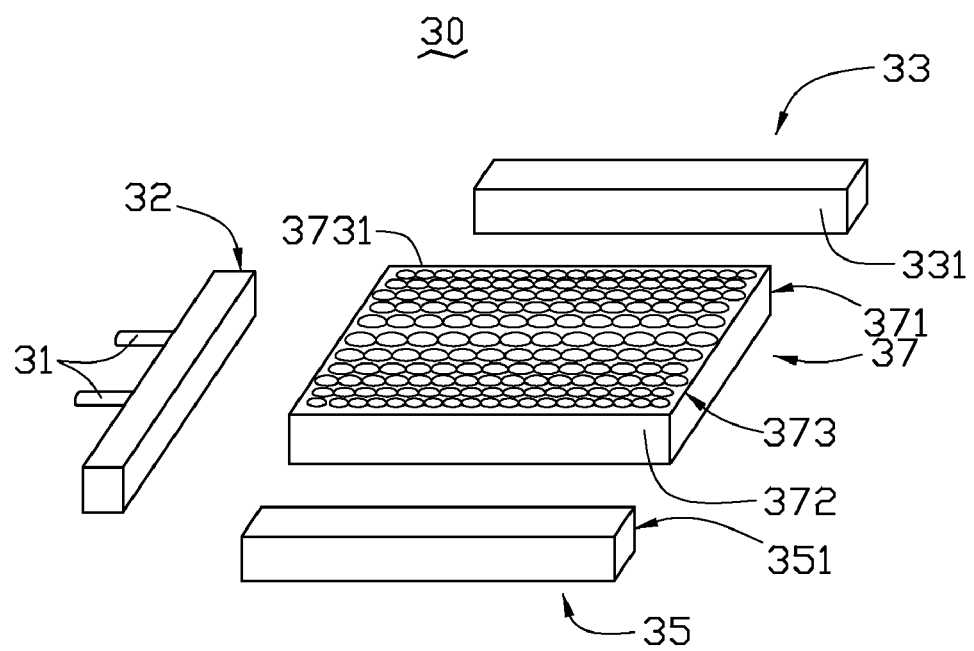
FIG. 7 is an exploded, isometric view of an embodiment of a planar illumination device.
Figure 8:
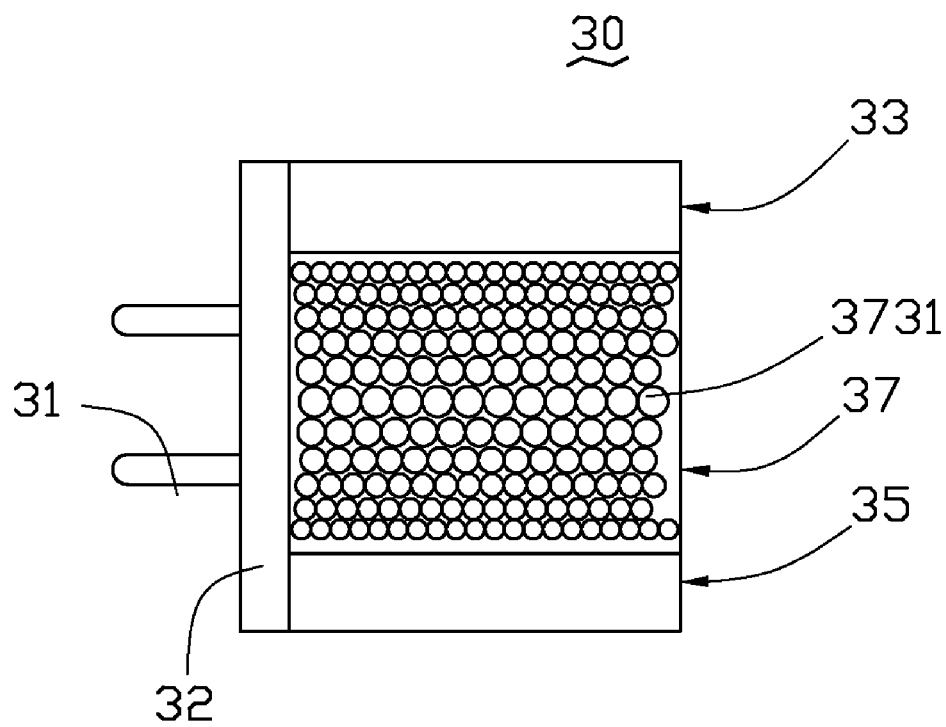
FIG. 8 is an assembled, top plan view of the illumination device of FIG. 7.

FIGS. 7 and 8 is an embodiment of a planar illumination device 30 is shown. The illumination device 30 includes an electrical connector 31, a metallic connecting plate 32, a first housing 33, a first LED light source (not shown), a second housing 35, a second LED light source (not shown), and a light guide plate 37. The first and the second LED light sources are respectively enclosed in the first and the second housings 33, 35. The first and the second LED light sources electrically connect with the electrical connector 31 via the metallic connecting plate 32. The metallic connecting plate 32 is located between and contacts with the first and the second housings 33, 35. The first housing 33 and the second housing 35 are positioned at opposite sides of the light guide plate 37. The first housing 33 has a first light emitting surface 331. The second housing 35 has a second light emitting surface 351 opposite to and parallel to the first light emitting surface 331 of the first housing 33. The light guide plate 37 has a first light incidence surface 371 facing the first light emitting surface 331, a second light incidence surface 372 facing the second light emitting surface 351, and a top light exiting surface 373 located adjacent to and perpendicular to the first and the second light incidence surface 371, 372. A plurality of bulge points 3731 are formed on the light exiting surface 373, for evenly distributing light over the light exiting surface 373.

Figure 9:
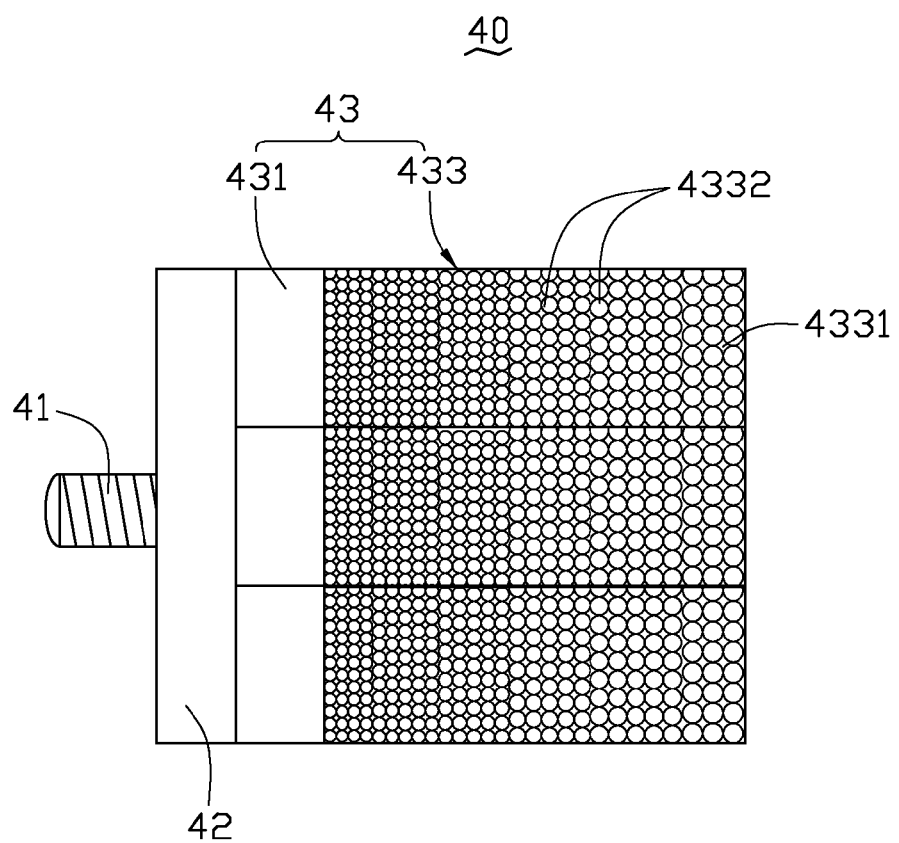
FIG. 9 is a top view of an embodiment of a planar illumination device.

Referring to FIG. 9, an embodiment of an illumination device 40 includes an electrical connector 41, a metallic connecting plate 42, and three illumination units 43. The illumination units 43 are parallel to each other and connected side by side. Each of the illumination units 43 includes a housing 431, a LED light source (not shown) received in the housing 431 and electrically connected to the metallic connecting plate 42, and a light guide plate 433 connected to the housing 431. The light guide plate 433 has a light incidence surface (not shown) contacting with a light emitting surface (not shown) of the housing 431, a light exiting surface 4331, and a plurality of bulge points 4332 formed on the light exiting surface 4331. The light exiting surfaces 4331 of the light guide plate 433 are coplanar with each other and cooperatively form a larger light exiting surface. The electrical connector 41 includes a pin which has a threaded end.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A planar illumination device comprising:
   at least two light sources;
   at least two housing structures respectively receiving the at least two light sources therein, wherein the at least two housing structures each comprise a light emitting surface through which the light emitted from the at least two light sources exits the at least two housing structures;
   at least one light guide plate comprising at least two light incidence surfaces through which the light enters into the at least one light guide plate, the at least two light incidence surfaces respectively contacting with the light emitting surfaces of the at least two housing structures;
   at least one light exiting surface through which the light exits the at least one light guide plate, wherein the at least one light exiting surface comprises a plurality of continuously connected bulge points formed thereon, and the diameters of bottom ends of the bulge points at the at least one light exiting surface of the at least one light guide plate gradually increase from a position adjacent to the at least two light sources towards a position away from the at least two light sources; and
   a metallic connecting plate;
   wherein the at least two light sources comprise two light sources, and the at least two housing structures comprise two housing structures, and wherein the two housing structures are parallel to each other, the metallic connecting plate is located between and contacts with the two housing structures, and the two light sources are electrically connected with each other via the metallic connecting plate.

2. The planar illumination device of claim 1, wherein the at least one light guide plate comprises a light guide plate, and wherein the two housing structures each comprise a light emitting surface, the light emitting surfaces of the two housing structures are parallel to each other, the light guide plate are sandwiched between and contacts with the two housing structures, and the light guide plate comprises two light incidence surfaces respectively contacting with the light emitting surfaces of the two housing structures.

3. The planar illumination device of claim 1, wherein a bottom end of each bulge point is tangent to a bottom end of an adjacent bulge point.

4. The planar illumination device of claim 1, wherein a diameter of each bulge point gradually decreases from a bottom end of the each bulge point at the at least one light exiting surface of the at least one light guide plate towards a top end of the each bulge point away from the at least one light exiting surface of the at least one light guide plate.

\* \* \* \* \*